United States Patent
Westhues et al.

(10) Patent No.: US 9,927,922 B2
(45) Date of Patent: *Mar. 27, 2018

(54) MULTIPLE CORRELATIONS IN A TOUCH SENSOR

(71) Applicant: Microsoft Technology Licensing, LLC, Redmond, WA (US)

(72) Inventors: Jonathan Westhues, Portland, OR (US); Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,386

(22) Filed: Mar. 2, 2017

(65) Prior Publication Data

US 2017/0177161 A1    Jun. 22, 2017

Related U.S. Application Data

(63) Continuation of application No. 14/747,971, filed on Jun. 23, 2015, now Pat. No. 9,619,094.

(51) Int. Cl.
G06F 3/0488    (2013.01)
G06F 3/044    (2006.01)
G06F 3/041    (2006.01)

(52) U.S. Cl.
CPC ............ *G06F 3/0418* (2013.01); *G06F 3/044* (2013.01); *G06F 3/0416* (2013.01)

(58) Field of Classification Search
CPC ..... G06F 3/0488; G06F 3/04883; G06F 3/044
See application file for complete search history.

(56) References Cited

U.S. PATENT DOCUMENTS 5,053,757 A    10/1991    Meadows
8,519,970 B2    8/2013    Westhues et al.
(Continued)

OTHER PUBLICATIONS

IPEA European Patent Office, Second Written Opinion Issued in PCT Application No. PCT/US2016/032954, dated May 26, 2017, WIPO 8 Pages.
(Continued)

*Primary Examiner* — Ricardo L Osorio
(74) *Attorney, Agent, or Firm* — Alleman Hall Creasman & Tuttle LLP

(57) ABSTRACT

Embodiments are disclosed that relate to touch input detection in a touch sensor. One example provides a method comprising establishing a first reference sequence, starting with a first set of candidate reference sequences each differing from the first reference sequence, reducing the first set of candidate reference sequences by applying a rule set to the first set to derive a relatively smaller second set of candidate reference sequences, for each candidate reference sequence in the second set of candidate reference sequences, calculating a touch detection performance score of a combined reference sequence, and configuring at least a portion of a receive circuit to correlate signals to at least one of the touch detection conditions by using the first reference sequence in a combined correlation operation with at least a selected candidate reference sequence from the second set of candidate reference sequences.

20 Claims, 6 Drawing Sheets

(56) References Cited

U.S. PATENT DOCUMENTS

| | | |
|---|---|---|
| 8,593,160 B2 | 11/2013 | Thompson et al. |
| 8,610,589 B2 | 12/2013 | Wang et al. |
| 9,285,902 B1* | 3/2016 | Kremin .................. G06F 3/044 |
| 2002/0064245 A1 | 5/2002 | McCorkle |
| 2003/0108133 A1 | 6/2003 | Richards |
| 2005/0073507 A1 | 4/2005 | Richter et al. |
| 2008/0157867 A1 | 7/2008 | Krah |
| 2011/0063227 A1 | 3/2011 | Wu et al. |
| 2011/0109568 A1 | 5/2011 | Wu et al. |
| 2011/0167391 A1 | 7/2011 | Momeyer et al. |
| 2011/0234508 A1 | 9/2011 | Oda et al. |
| 2011/0249791 A1* | 10/2011 | Wang ..................... A61B 6/08 378/62 |
| 2011/0249799 A1* | 10/2011 | Lalena .................... A61B 6/08 378/97 |
| 2012/0013565 A1 | 1/2012 | Westhues et al. |
| 2013/0027359 A1 | 1/2013 | Schevin et al. |
| 2013/0257518 A1 | 10/2013 | Hou et al. |
| 2014/0078112 A1 | 3/2014 | Sheng et al. |
| 2014/0337786 A1* | 11/2014 | Luo ....................... G06F 3/0416 715/773 |
| 2015/0029151 A1 | 1/2015 | Galambos et al. |
| 2016/0080897 A1* | 3/2016 | Moore .................... H04W 4/02 340/539.13 |

OTHER PUBLICATIONS

Lanka S. et al., "Designing capacitive sensing for a specific application," Planet Analog Website, Available Online at http://www.planetanalog.com/document.asp?doc_id=528258&site+planetanalog, Dec. 2, 2011, 6 pages.

ISA European Patent Office, International Search Report and Written Opinion Issued in Application No. PCT/US2016/032954, dated Jul. 27, 2016, WIPO, 13 pages.

United States Patent and Trademark Office, Notice of Allowance Issued in U.S. Appl. No. 14/747,971, dated Dec. 9, 2016, 7 pages.

"International Preliminary Report on Patentability Issued in PCT Application No. PCT/US2016/032954", dated Sep. 27, 2017, 9 Pages.

* cited by examiner

MULTIPLE CORRELATIONS IN A TOUCH SENSOR

CROSS REFERENCE TO RELATED APPLICATIONS

This application is a continuation of U.S. patent application Ser. No. 14/747,971, filed on Jun. 23, 2015, and titled "MULTIPLE CORRELATIONS IN A TOUCH SENSOR", the entire disclosure of which is hereby incorporated herein by reference.

BACKGROUND

Some touch sensors are configured to detect touch input by sensing changes in capacitance between rows and columns of an electrode matrix. Noise from a variety of sources may couple into the touch sensor, however, which can reduce the integrity of touch sensor output and lead to erroneous touch detection. As such, approaches that mitigate noise may be employed in operating a touch sensor.

SUMMARY

Embodiments are disclosed that relate to touch input detection in a touch sensor. One example provides a method comprising establishing a first reference sequence, starting with a first set of candidate reference sequences each differing from the first reference sequence, reducing the first set of candidate reference sequences by applying a rule set to the first set to derive a relatively smaller second set of candidate reference sequences, for each candidate reference sequence in the second set of candidate reference sequences, calculating a touch detection performance score of a combined reference sequence, and configuring at least a portion of a receive circuit to correlate signals to at least one of the touch detection conditions by using the first reference sequence in a combined correlation operation with at least a selected candidate reference sequence from the second set of candidate reference sequences.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
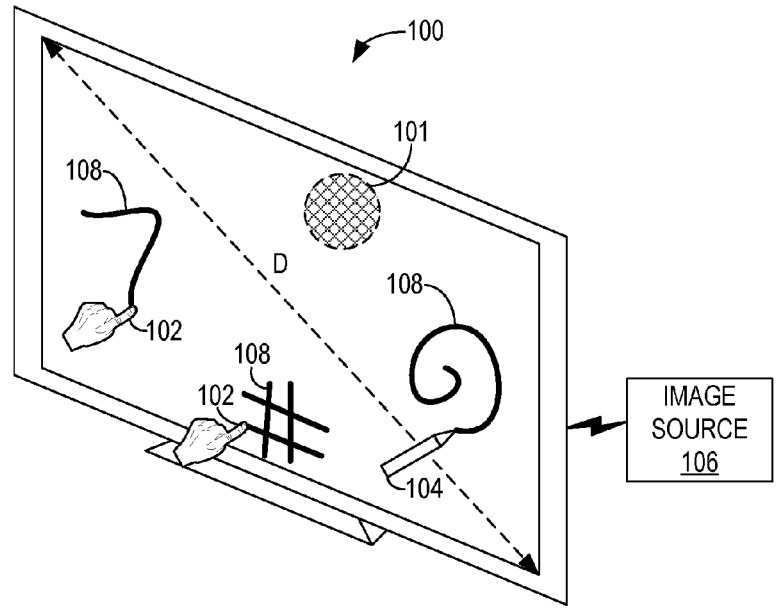
FIG. 1 shows a touch sensitive display including a touch sensor.

A central goal in touch sensor design is the accurate identification of touch input. In many touch sensors, the accuracy of touch input identification may significantly depend on the signal to-noise ratio (SNR) of touch sensor output. Touch sensor SNR may be raised by increasing the amplitude of touch sensor output and/or by reducing noise. Driving a touch sensor with increased voltage may provide a relatively straightforward approach to raising SNR, as the amplitude of touch sensor output may be proportional to the driving voltage. Such an approach, however, presents several potential drawbacks, including increased power consumption. Further, when placed proximate a display, current flowing through the touch sensor may couple into the display, which can interfere with display output. As such, a variety of alternative approaches have been developed for increasing touch sensor SNR, some of which prioritize addressing noise over increasing the amplitude of touch sensor output.

A touch sensor may encounter a variety of noise types from a variety of sources. For example, large currents at frequencies of 50 or 60 Hz may flow in a touch sensor due to voltage gradients established by a mains power system. Alternatively or additionally, high-frequency (e.g., 1 MHz) currents resulting from radio and/or television broadcasts may arise in a touch sensor. The respective frequencies of both noise types, however, may be well-separated from frequencies at which a touch sensor is driven, which are typically on the order of 100 kHz. Both noise types, and others that generate noise frequencies different from a touch sensor's driving frequencies, may thus be effectively mitigated by employing frequency-selective filtration.

A plurality of noise sources may produce noise frequencies close to a touch sensor's driving frequencies. Such noise sources may include but not be limited to switch mode power supplies (e.g., which may operate with switching frequencies on the order of 100 kHz) and power supplies that produce high voltage output such as fluorescent lamp power supplies.

In some examples, a display may be the most significant source of touch sensor noise when positioned proximate a touch sensor. Noise coupling from the display into the touch sensor may be exacerbated when the display is optically bonded to the touch sensor via a transparent adhesive, rather than being spaced apart with an air gap. Such noise coupling may increase as the display is brought closer to the touch sensor, which may be facilitated by the transparent adhesive, as it may allow for closer spacings than are practical with an air gap. Further, noise coupling may increase due to the higher dielectric constant (e.g., approximately 3-4) of the transparent adhesive relative to that (e.g., approximately 1) of air. In this example, noise may be coupled from the display to the touch sensor capacitively, in which case the amplitude of noise currents in the touch sensor may be approximately proportional to the dielectric constant of the insulating material separating the display and touch sensor, and to the reciprocal of the thickness of the insulating material.

Noise coupled from a display into a proximate touch sensor may include multiple components. For example, such noise may include a relatively strong component at the horizontal scan frequency (e.g., 100 kHz) of the display, and this horizontal scan frequency may be close to the touch sensor driving frequencies. This noise component may be independent of the graphical output from the display and may have an amplitude and frequency that is approximately constant in time. Other components, however, may depend on the display output and thus may vary in time. Accordingly, approaches that enable effective noise removal in a touch sensor may be adapted to the touch sensor configuration, display configuration, and/or noise conditions, among other potential factors.

FIG. 1 shows a touch sensitive display 100 including a touch sensor 101. In some examples, display 100 may be a large format display with a diagonal dimension D greater than 1 meter, for example, though the display may assume any suitable size. Display 100 may be configured to sense one or more sources of input, such as touch input imparted via a digit 102 of a user and/or input supplied by an input device 104, shown in FIG. 1 as a stylus. Digit 102 and input device 104 are provided as non-limiting examples and that any other suitable source of input may be used in connection with display 100. Further, display 100 may be configured to receive input from both input devices in contact with the display and input devices not in contact with the display. "Touch input" as used herein refers to both types of input. In some examples, display 100 may be configured to receive input from two or more sources simultaneously, in which case the display may be referred to as a multi-touch display.

Display 100 may be operatively coupled to an image source 106, which may be, for example, a computing device external to, or housed within, the display. Image source 106 may receive input from display 100, process the input, and in response generate appropriate graphical output 108 for the display. In this way, display 100 may provide a natural paradigm for interacting with a computing device that can respond appropriately to touch input. Details regarding an example computing device are described below with reference to FIG. 8.

Figure 2:
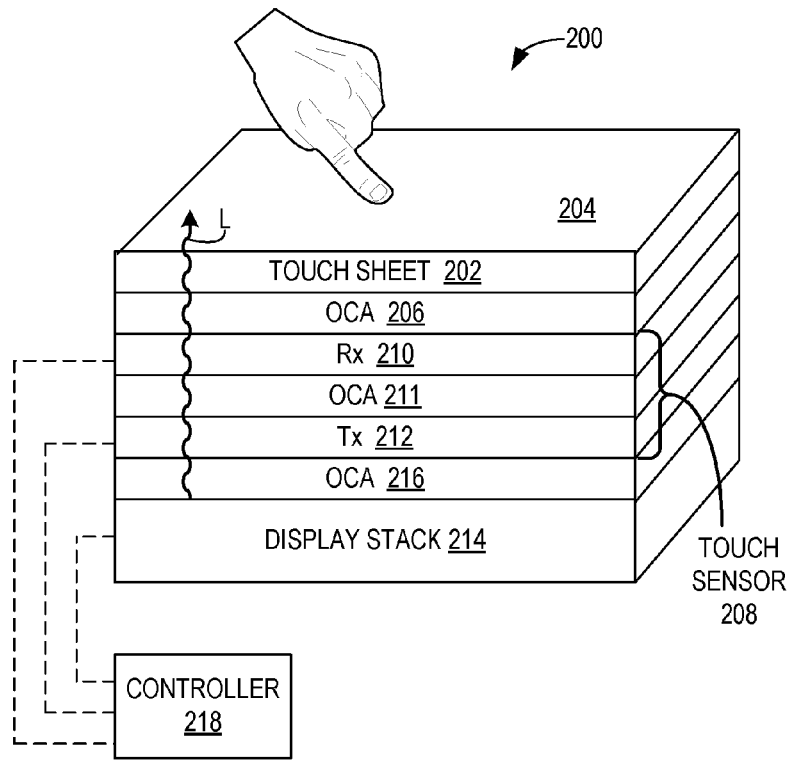
FIG. 2 is a cross-sectional view of an optical stack of the display of FIG. 1.

FIG. 2 is a cross-sectional view of an optical stack 200 of display 100 (FIG. 1). Optical stack 200 includes a plurality of components configured to enable the reception of touch input and the generation of graphical output. As shown in FIG. 2, optical stack 200 includes an optically clear touch sheet 202 having a top surface 204 for receiving touch input, and an optically clear adhesive (OCA) 206 bonding a bottom surface of the touch sheet to a top surface of a touch sensor 208, which may be touch sensor 101 (FIG. 1), for example. Touch sheet 202 may be comprised of any suitable materials, such as glass or plastic. As used herein, "optically clear adhesive" refers to a class of adhesives that transmit substantially all (e.g., about 99%) of incident visible light.

As described in further detail below with reference to FIG. 3, touch sensor 208 includes a matrix of electrodes that form capacitors whose capacitances may be evaluated in detecting touch input. As shown in FIG. 2, the electrodes may be formed in two separate layers: a receive electrode layer (Rx) 210 and a transmit electrode layer (Tx) 212 positioned below the receive electrode layer. Receive and transmit electrode layers 210 and 212 may each be formed on a respective dielectric substrate comprising materials including but not limited to glass, polyethylene terephthalate (PET), or cyclic olefin polymer (COP) film. Receive and transmit electrode layers 210 and 212 may be bonded together by a second optically clear adhesive 211. OCA 211 may be an acrylic pressure-sensitive adhesive film, for example. However, the touch sensor configuration illustrated in FIG. 2 is provided as an example, and that alternative arrangements are within the scope of this disclosure. In other implementations, for example, layers 210, 211, and 212 may be integrally formed as a single layer with electrodes disposed on opposite surfaces of the integral layer. Further, touch sensor 208 may alternatively be configured such that transmit electrode layer 212 is provided above, and bonded to via OCA 211, receive electrode layer 210 positioned therebelow.

Receive and transmit electrode layers 210 and 212 may be formed by a variety of suitable processes. Such processes may include deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing. In one example, metalized sensor films may be disposed on a user-facing side of a substrate, with the metal facing away from the user or alternatively facing toward the user with a protective sheet (e.g., comprised of PET) between the user and metal. Although transparent conducting oxide (TCO) is typically not used in the electrodes, partial use of TCO to form a portion of the electrodes with other portions being formed of metal is possible. In one example, the electrodes may be thin metal of substantially constant cross section, and may be sized such that they may not be optically resolved and may thus be unobtrusive as seen from a perspective of a user. Suitable materials from which electrodes may be formed include various suitable metals (e.g., aluminum, copper, nickel, silver, gold, etc.), metallic alloys, conductive allotropes of carbon (e.g., graphite, fullerenes, amorphous carbon, etc.), conductive polymers, and conductive inks (e.g., made conductive via the addition of metal or carbon particles).

Continuing with FIG. 2, touch sensor 208 is bonded, at a bottom surface of transmit electrode layer 212, to a display stack 214 via a third optically clear adhesive 216. Display stack 214 may be a liquid crystal display (LCD) stack, organic light-emitting diode (OLED) stack, or plasma display panel (PDP), for example. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as an image displayed on top surface 204 of touch sheet 202.

Further variations to optical stack 200 are possible. For example, implementations are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

FIG. 2 also shows a controller 218 operatively coupled to receive electrode layer 210, transmit electrode layer 212, and display stack 214. Controller 218 is configured to drive transmit electrodes in transmit electrode layer, receive signals resulting from driven transmit electrodes via receive electrodes in receive electrode layer 210, and locate, if detected, touch input imparted to optical stack 200. Controller 218 may further drive display stack 214 to enable graphical output responsive to touch input. Two or more controllers may alternatively be provided, and in some examples, respective controllers for each of receive electrode layer 210, transmit electrode layer 212, and display stack 214. In some implementations, controller 218 may be implemented in image source 106 (FIG. 1).

Figure 3:
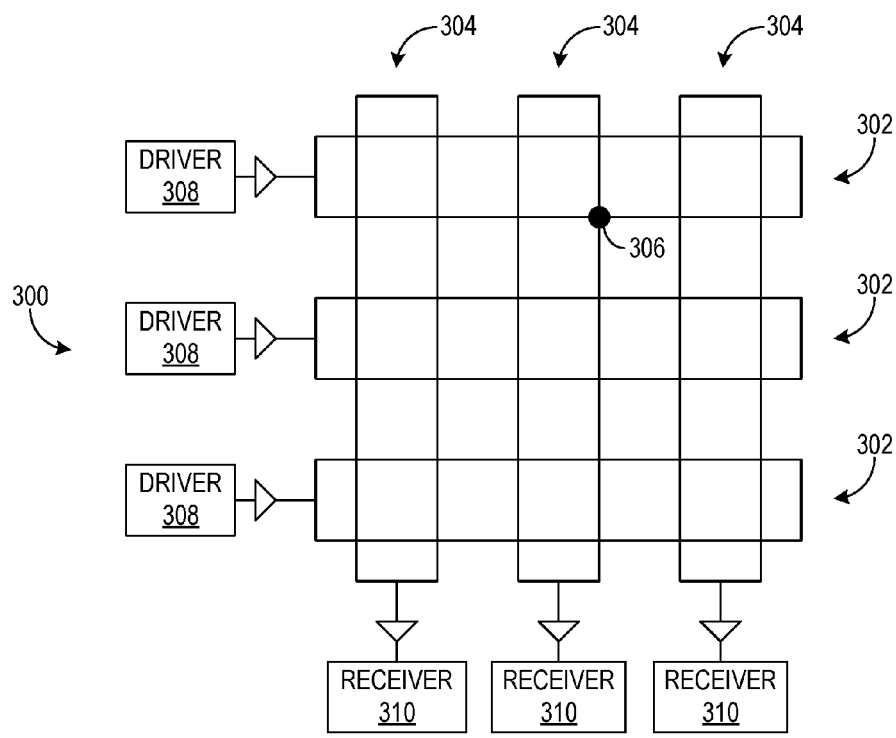
FIG. 3 shows an example touch sensor matrix.

FIG. 3 shows an example touch sensor matrix 300. Matrix 300 may be included in touch sensor 208 of optical stack 200 (FIG. 2) to bestow touch sensing functionality to display 100 (FIG. 1), for example. Matrix 300 includes a plurality of electrodes in the form of transmit rows 302 vertically separated from receive columns 304. Transmit rows 302 and receive columns 304 may be respectively formed in transmit electrode layer 212 and receive electrode layer 210 of optical stack 200, for example. Each vertical intersection of transmit rows 302 with receive columns 304 forms a corresponding node such as node 306 whose electrical properties (e.g., capacitance) may be measured to detect touch input. Three transmit rows 302 and three receive columns 304 are shown in FIG. 3 for the purpose of clarity, though matrix 300 may include any suitable number of transmit rows and receive columns, which may be on the order of one hundred or one thousand, for example.

While a rectangular grid arrangement is shown in FIG. 3, matrix 300 may assume other geometric arrangements—for example, the matrix may be arranged in a diamond pattern. Alternatively or additionally, individual electrodes in matrix 300 may assume nonlinear geometries—e.g., electrodes may exhibit curved or zigzag geometries, which may minimize the perceptibility of display artifacts (e.g., aliasing, moiré patterns) caused by occlusion of an underlying display by the electrodes. Moreover, the designation of transmit rows 302 and receive columns 304 is arbitrary and may be reversed such that rows are configured as receive rows and columns are configured as transmit columns.

Each transmit row 302 in matrix 300 may be coupled to a respective driver 308 configured to drive its corresponding transmit row with a time-varying voltage. In some implementations, drivers 308 of matrix 300 may be driven by a microcoded state machine implemented within a field-programmable gate array (FPGA) forming part of controller 218 (FIG. 2), for example. Each driver 308 may be implemented as a shift register having one flip-flop and output for its corresponding transmit row, and may be operable to force all output values to zero, independently of register state. The inputs to each shift register may be a clock, data input, and a blanking input, which may be driven by outputs from the microcoded state machine. Signals may be transmitted by filling the shift register with ones on every output to be excited, and zeroes elsewhere, and then toggling the blanking input with a desired modulation. Such signals are referred to herein as "excitation sequences", as these signals may be time-varying voltages that, when digitally sampled, comprise a sequence of pulses—e.g., one or more samples of a relatively higher (lower) digital value followed by one or more samples of a relatively lower (higher) digital value. If the shift register is used in this fashion, excitation sequences may take on only two digital values—e.g., only binary excitation sequences can be transmitted. In other implementations, drivers 308 may be configured to transmit non-binary excitation sequences that can assume three or more digital values. Non-binary excitation sequences may enable a reduction in the harmonic content of driver output and decrease the emissions radiated by matrix 300.

In some implementations, matrix 300 may be configured to communicate with a stylus. This implementation may at least partially enable touch sensitive display 100 to communicate with input device 104 when matrix 300 is implemented in display 100. Specifically, an electrostatic link may be established between one or more transmit rows 302 and a conductive element (e.g., electrode tip) of the stylus, along which data may be transmitted. In one example, communication via the electrostatic link is initiated by the transmission of a synchronization pattern from matrix 300 to the stylus. The synchronization pattern may enable matrix 300 and the stylus to obtain a shared sense of time, and may be transmitted via multiple transmit rows 302 so that the stylus can receive the pattern regardless of its position relative to the matrix. The shared sense of time may facilitate the correlation of a time at which the stylus detects an excitation sequence or other signal transmitted on transmit rows 302 to a location in matrix 300, as the synchronization pattern may yield an indication of the order in which transmit rows are driven. Such correlation may enable the stylus to determine at least one coordinate (e.g., y-coordinate) relative to matrix 300, which may be transmitted back to the matrix (e.g., via the electrostatic link) or to an associated display via a different communication protocol (e.g., radio, Bluetooth). To determine a second coordinate (e.g., x-coordinate) of the stylus, all transmit rows 302 may be held at a constant voltage, and the stylus may transmit a time-varying voltage to matrix 300, which may sequentially measure currents resulting from the stylus voltage in each receive column 304 to ascertain the second coordinate.

Each receive column 304 in matrix 300 may be coupled to a respective receiver 310 configured to analyze received signals resulting from the transmission of excitation sequences on transmit rows 302. During touch detection, matrix 300 may hold all transmit rows 302 at a constant voltage except for an active transmit row along which an excitation sequence is transmitted. During transmission of the excitation sequence, all receive columns 304 may be held at a constant voltage (e.g., ground). With the excitation sequence applied to the active transmit row 302 and all receive columns 304 held at the constant voltage, a current may flow through each of the nodes formed by the vertical intersections of the active transmit row with the receive columns. Each current may be proportional to the capacitance of its corresponding node. Hence, the capacitance of each node may be measured by measuring each current flowing from the active transmit row 302. In this way, touch input may be detected by measuring node capacitance. Matrix 300 may be repeatedly scanned at a frame rate (e.g., 60 Hz, 120 Hz) to persistently detect touch input, where a complete scan of a frame comprises applying an excitation sequence to each transmit row 302, and for each driven transmit row, collecting output from all of the receive columns 304. However, in other examples, a complete scan of a frame may be a scan of a desired subset, and not all, of one or both of transmit rows 302 and receive columns 304.

Other measurements may be performed on matrix 300 to detect touch, alternatively or additionally to the measurement of capacitance—for example, a time delay between the transmission of an excitation sequence and reception of a received signal resulting from the transmitted excitation sequence, and/or a phase shift between the transmitted excitation sequence and the resulting received signal may be measured.

As described above, a touch sensor may experience a variety of noise types from a variety of sources. One approach for mitigating noise is to design an excitation sequence based on expected noise conditions. For example, if noise coupled into the touch sensor is known to be stationary (e.g., does not vary in time) and can be sufficiently characterized (e.g., via spectral analysis to determine one or more frequency bands in which noise is prevalent), the excitation sequence can be designed such that received signals resulting from transmission of the excitation sequences have relatively less gain in the noise frequency bands. As a non-limiting example, an LCD may generate noise having strong components around frequencies of 80 kHz, 90 kHz, and 160 kHz. An excitation sequence may be designed to have reduced gain around these frequencies; for example, the excitation sequence may be designed such that its gain is highest at 120 kHz.

An excitation sequence may be designed in a variety of suitable manners. If the drivers (e.g., drivers 308) of a touch sensor are operable to produce non-binary excitation sequences, an ideal spectrum of an excitation sequence may be designed in the frequency domain. A Fourier transform, for example, may be used to obtain the excitation sequence in the time domain. As another non-limiting example, brute force searching may be used to find a sufficient excitation sequence by assessing the performance of each excitation sequence in a set of excitation sequences. Other approaches, however, may be desired to address noise that cannot be characterized and/or that is time-varying.

An alternative or additional approach to mitigating touch sensor noise may be to increase the integration time of receive columns for noise conditions in which noise is stationary and white (e.g., approximately equally distributed throughout a wide band of frequencies). The integration time may be a duration in which output is collected from a receive column to detect touch input at that receive column; this may include measuring the amplitude of a received signal at the receive column throughout the integration time, for example. An increased integration time may be accompanied by an increase in the duration throughout which excitation sequences are transmitted—e.g., an equal increase. Increasing the integration time may afford greater flexibility in designing excitation sequences, as making more of the time domain available may make more of the frequency domain available, increasing the range of frequencies that can be accessed by the excitation sequence. Further, increased integration time may raise the amplitude of received signals at receive columns, in turn directly increasing the SNR of touch sensor output. As a non-limiting example, touch sensor output SNR may generally increase by a factor of 10 log(t) dB if the integration time is increased by a factor t.

In some examples, an increase in integration time may be accompanied by repeated transmission of an excitation sequence. For example, the integration time may be doubled and the same excitation sequence transmitted twice during the integration time. If noise remains stationary throughout the integration time, and the noise associated with the first transmission of the excitation sequence is uncorrelated with the noise associated with the second transmission of the excitation sequence, the SNR of touch sensor output may be increased by 3 dB relative to that associated with a single transmission of the excitation sequence during the original integration time. As described in further detail below, correlation between noise and other quantities may be defined in various suitable manners; in one example, two noise quantities may be considered uncorrelated if the expectation operation of the product of the two noise quantities yields zero.

A variety of methods may be used to increase integration time. Generally, integration time may be inversely proportional to the product of the frame rate of a touch sensor with the number of transmit rows of the touch sensor. As such, one method of increasing the integration time may be to reduce the touch sensor frame rate (e.g., from 120 Hz to 60 Hz), though this reduces the temporal resolution of touch detection. Another method of increasing the integration time may be to reduce the number of transmit rows. For implementations in which the number of rows is unequal to the number of columns, the lesser of the rows and columns may be configured as the transmission elements for receiving an excitation sequence. Yet another method of increasing the integration time may be to increase the pitch size—e.g., the distance between adjacent transmit rows (or transmit columns if configured as such). Reducing the number of transmit rows and altering their pitch, however, reduces the spatial resolution of touch detection.

In some examples, integration time may be increased by simultaneously transmitting two or more orthogonal excitation sequences on two or more transmit rows. "Orthogonal" as used herein may assume various definitions; in some examples, two orthogonal sequences may be complementary sequences. A first and second binary sequence may be complementary if each digital bit of the first sequence is different from each corresponding digital bit of the second sequence—e.g., for every 1 of the first sequence, the corresponding bit of the second sequence is 0. As another non-limiting example, two sequences may be considered orthogonal if they are completely uncorrelated (e.g., the result of correlation is zero), where correlation may be defined in various manners (e.g., convolution, cross-correlation). The use of orthogonal sequences allows the simultaneous transmission of two sequences that do not interfere with each other. As integration time may be inversely proportional to the number of transmit rows in a touch sensor, the integration time may be increased by a factor L by exciting L transmit rows simultaneously—e.g., the integration time may be doubled by exciting two transmit rows simultaneously.

For some noise conditions, increased integration time may not appreciably increase the SNR of touch sensor output. For example, mitigation of narrow band noise may not be improved by increasing integration time. Further, narrow band noise may cause the noise associated with the transmission of a first excitation sequence to be highly correlated with the transmission of a second excitation sequence, resulting in a touch sensor output SNR that is not significantly increased relative to that associated with the transmission of a single excitation sequence. Increased integration time may also fail to increase touch sensor output SNR for noise in the frequency band of the excitation sequence used to drive a touch sensor.

One approach that may better address at least some of the limitations of excitation frequency design and/or increased integration time is to transmit multiple excitation sequences on the same transmit row. This approach may be particularly applicable to touch sensors equipped with drive circuits (e.g., drivers 308) operable to output a relatively wide range of voltages (e.g., 0-100 V), for example. In some implementations, multiple orthogonal sequences may be transmitted on the same transmit row.

A non-limiting example of transmitting multiple excitation sequences on the same transmit row follows. In this example, two excitation sequences are transmitted on the same transmit row: a first excitation sequence having of frequency 100 kHz, and a second excitation sequence of frequency 50 kHz. The two excitation sequences may be orthogonal to each other by virtue of their frequencies and the integration time (e.g., 40 μs), regardless of their phases. The two excitation sequences may be used to address narrow band noise of frequency 100 kHz. Due to the correspondence of the frequencies of the first excitation sequence with the narrow band noise, the SNR of touch sensor output may be increased by transmitting the second excitation sequence, and not the first excitation sequence. While two excitation sequences are described in this example, three or more sequences can be used as well.

As with multiple orthogonal sequences, simultaneous transmission of multiple non-orthogonal excitation sequences may yield results that do not sufficiently mitigate touch sensor noise, however. As a non-limiting example, two non-orthogonal, binary excitation sequences may be simultaneously transmitted on a given transmit row. Due to their non-orthogonality, the two sequences may share a degree of similarity in the frequency domain, and as such, may address similar noise frequency bands, reducing the overall effectiveness of noise mitigation.

For implementations in which multiple excitation sequences are transmitted on the same transmit row, a determination may be made as to which of the multiple excitation sequences yields the highest touch sensor output SNR. In one example, multiple readings may be collected from a receive column during the integration time for that receive column to assess the noise associated with each excitation sequence—e.g., a statistical quantity such as variance may be computed for each sequence. The excitation sequence associated with the lowest noise level (e.g., lowest variance) may be selected for use in one or more transmit rows of a touch sensor. This approach, however, may reduce the integration time of each reading from each receive column. In another example, noise assessments across two or more frames may be used, though this may increase the latency of touch input detection. Further, heuristics may be used in selecting among multiple excitation sequences; as non-limiting examples, an excitation sequence that results in the detection of a relatively large or above threshold number of touch inputs may be unselected, as such number of touches may be indicative of false touch inputs and relatively low SNR. Another exemplary heuristic may include avoiding excitation sequences that yield outlying capacitances.

Yet another approach to mitigating touch sensor noise may include frequency-selective filtration. Frequency-selective filtration may be limited, however, to producing desired results for noise outside of the excitation sequence frequency band and for particular touch sensor hardware configurations. Further, filters required for performing such filtration may also increase touch sensor cost and complexity.

As can be appreciated from the preceding description, a variety of approaches have been developed for mitigating noise coupled into a touch sensor and increasing the SNR of touch sensor output. Each of the approaches described above, however, has at least one potential drawback, limiting their applicability to certain noise conditions and/or touch sensor configurations, and potentially placing reducing touch detection resolution. Accordingly, approaches for mitigating touch sensor noise and increasing the SNR of touch sensor output follow, which may have relatively greater applicability without increasing touch sensor cost and/or complexity, or reducing touch detection resolution.

Figure 4:
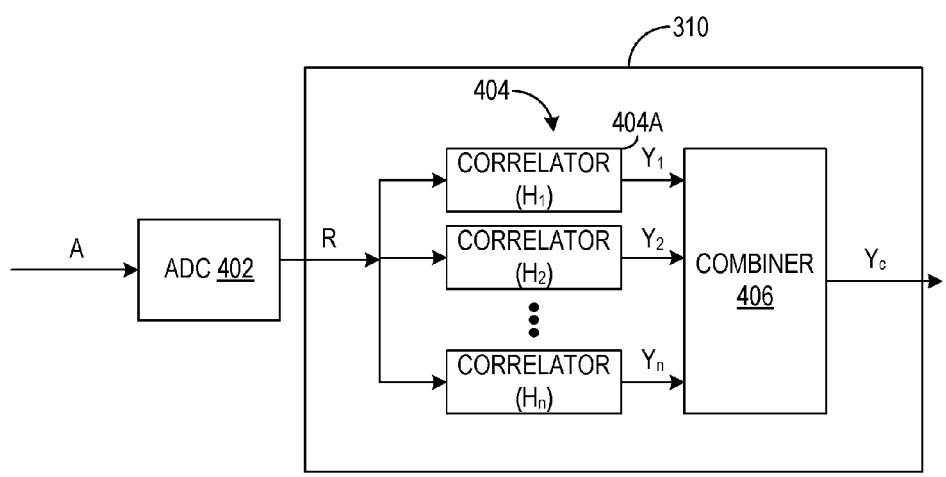
FIG. 4 schematically shows an example configuration of a receiver of the touch sensor matrix of FIG. 3.

FIG. 4 schematically shows an example configuration of a receiver 310 of touch sensor matrix 300 (FIG. 3). An analog signal A resulting from driving of at least one transmit row 302 (FIG. 3) is received via a receive column 304 and routed to an analog-to-digital converter (ADC) 402 positioned upstream receiver 310. The analog signal A may bear varying resemblances to the excitation sequence applied to the at least one transmit row; for scenarios in which the excitation sequence comprises a time-varying voltage, the analog signal A may be a time-varying voltage with a relatively attenuated amplitude. Other parameters may correspond to various degrees between the excitation sequence and the analog signal A—for example, the sequence and signal may share a common frequency but differ in phase. However, the form of the analog signal A may depend significantly on the instant noise conditions, and that, as such, the analog signal A may not resemble the excitation sequence.

ADC 402 may be configured to sample the analog signal A and produce a digitized version of the analog signal with any suitable number k of digital samples. FIG. 4 shows a received signal R resulting from the conversion of the analog signal A at ADC 402. Received signal R is fed to a set of n correlators 404 each configured to perform a correlation operation on the received signal R using a respective reference sequence $H_n$. Each correlation operation may generally produce a result indicating the degree to which the received signal R correlates with an associated reference sequence $H_n$.

In some implementations, the correlation operation may be defined such that the result of the correlation operation is a sum of the product of each digital sample k of the received signal R with a corresponding value (e.g., digital sample) k of a reference sequence $H_n$. As a non-limiting example, the output from a correlator 404A, which employs a reference sequence $H_1$, may assume the following form: $Y_1 = \Sigma H_1(k) *R(k)$, where the index of the summation may range from 0 to k. The output $Y_1$ from correlator 404A is referred to herein as a "correlation value".

By virtue of having multiple correlators 404 each with a different reference sequence $H_n$, receiver 310 may perform multiple correlations on the received signal R. Each reference sequence $H_n$ may be designed based on a variety of criteria, as will be explained in further detail below. The use of multiple reference sequences $H_n$ may overcome some limitations associated with the use of a single reference sequence in performing a correlation operation on a received signal—namely, that only a single noise condition or relatively limited number of noise conditions can be assumed in designing the single reference sequence. In contrast, the use of multiple reference sequences $H_n$ allows a relatively greater number of noise conditions to be considered in processing the received signal R; as a non-limiting example, a first reference sequence $H_1$ may be designed based on an expectation of the received signal R, while two or more other reference sequences may be designed on respective different noise conditions—e.g., designed to have relatively low amplitudes at respective frequency bands where narrow band noise is known or likely to reside, such that the narrow band noise is significantly mitigated in the correlation operation. Further, undesired attenuation to a received signal, which may otherwise result from performing the correlation operation using a single reference sequence, may be avoided by the use of multiple reference sequences $H_n$.

Although not shown in FIG. 4, receiver 310 may be configured to perform frequency-selective filtration on the received signal R in addition to the correlation operation. Such filtration may be implemented in componentry separate from correlators 404 such that filtration is performed upstream or downstream the correlation operation. In other implementations, filtration may be implemented in correlators 404 to provide a combined correlation/filtration operation. As a non-limiting example, the combined correlation/filtration operation may be performed on the received signal R to produce output $Y_1'$ of the following form: $Y_1'=\Sigma H_1'(k)*R(k)$, where $H_1'$ may be calculated from the convolution of $H_1$ and $F_1$, with $F_1$ being a set of filter coefficients.

Continuing with FIG. 4, the correlation values $Y_n$ produced by the correlation operation performed at each correlator 404 are fed to a combiner 406 configured to combine each correlation value $Y_n$ to determine a combined correlation value $Y_c$. The combined correlation value $Y_c$ succinctly parameterizes the degree to which the received signal R correlates with the reference sequences $H_n$. The combined correlation value $Y_c$ may thus singularly convey the correlation of the received signal R with a plurality of signal and/or noise conditions on which reference sequence design was based, for example. Combiner 406 is thus operable to perform what is referred to herein as a "combined correlation operation". The combined correlation operation may be defined in various suitable manners—for example, the combined correlation operation may include summing each correlation value $Y_n$ and dividing the sum by n to determine $Y_c$.

The combined correlation operation may facilitate a reduction in the complexity of correlation componentry without reducing the robustness of signal correlation. In particular, the combined correlation value $Y_c$, determined in receiver 310 by individually correlating the received signal R with a respective reference sequence $H_n$, may be equivalently determined by correlating the received signal R with a combination of the reference sequences $H_n$—e.g., a combined reference signal $H_c$. The combined reference signal $H_c$ may be more complex (e.g., assume more digital values) relative to the individual reference sequences $H_n$ and as such may stipulate the inclusion of a correlator relatively more complex than correlators 404. As a non-limiting example illustrating this concept, the received signal R may be correlated using receiver 310 to a first reference sequence $H_1$ and a second reference sequence $H_2$. The combined correlation value $Y_c$ resulting from these two individual correlations may assume the following form: $Y_c=(\frac{1}{2})*(\Sigma H_1(k)*R(k)+\Sigma H_2(k)*R(k))$. Thus, the correlators 404 that respectively implement the first and second reference sequences $H_1$ and $H_2$ are operable to take on the values of those reference sequences. In contrast, a combined correlation value $Y_c''$ determined by correlating the received signal R with a combined reference sequence $H_c$, computed as a sum of the first and second reference sequences $H_1$ and $H_2$, may assume the following form: $Y_c''=c*(\Sigma H_c(k)*R(k))$, where c is a constant. $Y_c''$ is equivalent to $Y_c$ if $H_c$ is expanded as the sum of $H_1$ and $H_2$, for example. Here, a correlator configured to correlate the received signal R with the combined reference sequence $H_c$ is operable to take on the values of the combined reference sequence. As $H_c$ is relatively more complex than the first and second reference sequences $H_1$ and $H_2$, by virtue of being their sum, this correlator may be relatively more complex than those used to implement the first and second reference sequences. Correlators 404 thus may achieve the results of using the combined reference sequence $H_c$ without necessarily taking on all of the values of the combined reference sequence.

The potential advantage of the combined correlation operation over correlation with a combined reference sequence may be particularly evident in implementations in which the individual reference sequences $H_n$ are binary. Correlators 404, for example, may be configured to implement binary reference sequences $H_n$, in which case the correlators are operable to take on two values such as 0 and 1, or −1 and 1, for example. In this example, correlators 404 may be configured to perform addition/subtraction. Conversely, a correlator configured to implement a combined reference sequence $H_c$, computed as a sum of the binary reference sequences $H_n$, would be configured to perform multiplication/division in addition to addition/subtraction, as the combined reference sequence may assume values other than the binary values assumed by the individual reference sequences $H_n$—e.g., a value of 2 would result from summing a 1 in a first binary reference sequence with a corresponding 1 in a second binary reference sequence; addition/subtraction would be insufficient to implement the 2 in the correlation operation. However, correlators 404 may enable a reduction in correlation complexity relative to the use of a single combined reference sequence even for implementations in which the individual reference sequences are non-binary.

Although not shown in FIG. 4, the combined correlation value $Y_c$ may be fed to a suitable component (e.g., controller 218 of FIG. 2) configured to identify at least one touch detection condition based on the combined correlation value. Identification of the at least one touch detection condition may be implemented in various suitable manners. As a non-limiting example, relatively extreme combined correlation values may prompt identification of definitive touch detection conditions—e.g., touch input may be identified in response to relatively extreme high values, while an absence of touch input may be identified in response to relatively extreme low values. Continuing with this example, intermediate combined correlation values outside of the relatively extreme high and low ranges may lead to identification of an indefinite touch detection condition—e.g., a condition in which the presence or absence of touch input cannot be definitively identified, which may prompt subsequent analysis or the intermediate value to be ignored, for example. Any suitable number and type of touch detection conditions may be implemented, which may partially depend on the reference sequences $H_n$ implemented in correlators 404.

Figure 5:
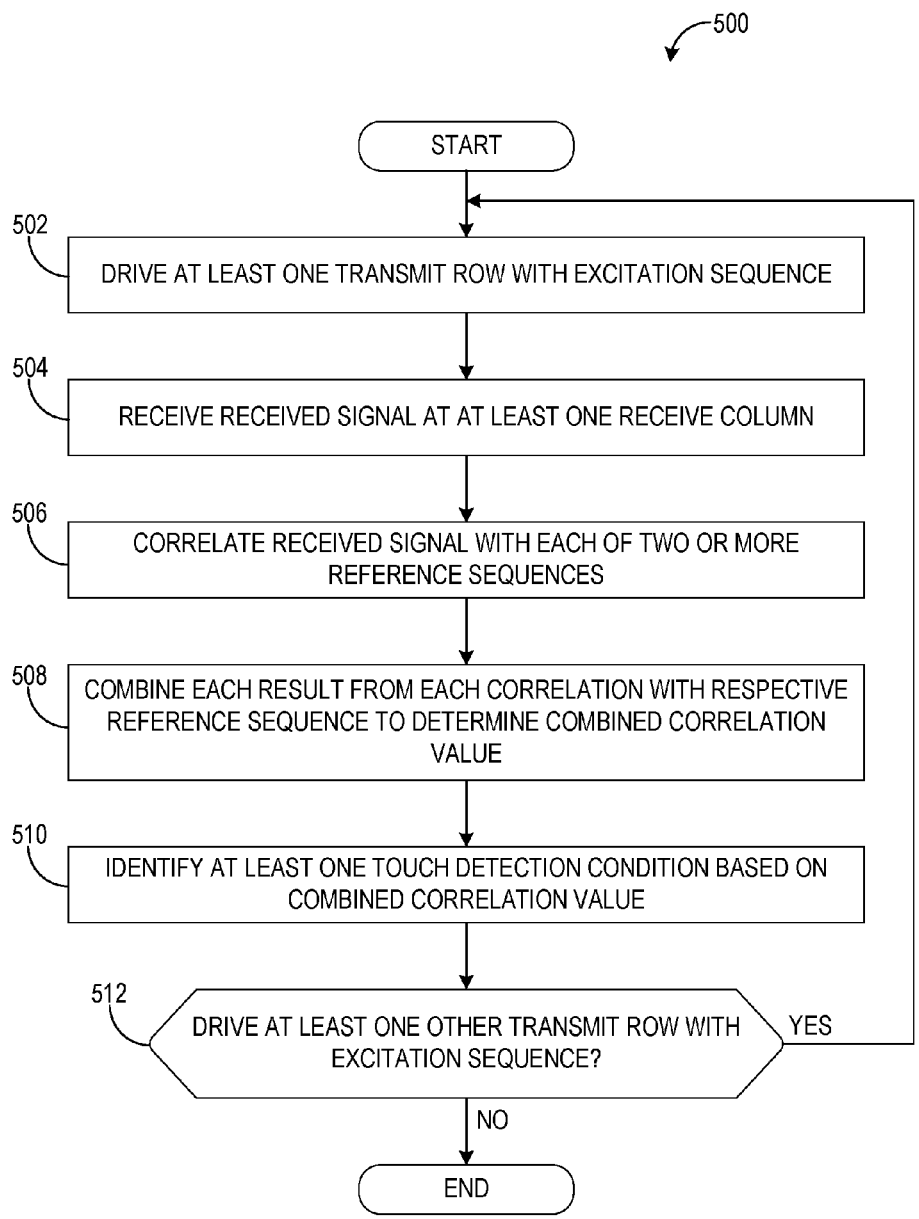
FIG. 5 shows a flowchart illustrating a method of operating a touch sensor matrix having transmit rows and receive columns.

FIG. 5 shows a flowchart illustrating a method 500 of operating a touch sensor matrix having transmit rows and receive columns. Method 500 may be used to operate touch sensor matrix 300, for example.

At 502 of method 500, at least one transmit row of the matrix is driven with an excitation sequence. The excitation sequence may be binary or non-binary, and may comprise a time-varying voltage.

At 504 of method 500, a received signal resulting from driving of the at least one transmit row is received at an at least one receive column of the matrix. The received signal may bear varying resemblances to the excitation sequence. For implementations in which the excitation sequence comprises a time-varying voltage, the received signal may comprise a time-varying voltage as well. The received signal may be digitally sampled by an analog-to-digital converter (ADC).

At 506 of method 500, the received signal (e.g., digitized signal converted via the ADC) is correlated (e.g., separately) with each of two or more reference sequences. Correlation may include multiplying each digital sample of the received signal with a corresponding value of the two or more reference sequences. Correlation may or may not include frequency-selective filtration. The two or more reference sequences may or may not be binary. Further, as described in greater detail below, the two or more reference sequences may be non-orthogonal.

At 508 of method 500, each result from each correlation of the received signal with a respective reference sequence is combined to determine a combined correlation value. The combined correlation value may be equivalently determined by correlating the received signal with a combination of the two or more reference sequences—e.g., by correlating with a combined reference sequence computed by summing together the two or more reference sequences.

At 510 of method 500, at least one touch detection condition is identified based on the combined correlation value. Various numbers and types of touch detection conditions may be used; in one example, three touch detection conditions may be used such that one of a definitive presence of touch condition, a definitive absence of touch condition, and an indefinite touch condition is identified.

At 512 it is determined whether to drive at least one other transmit row with the excitation sequence. If it is determined to drive the at least one other transmit row with the excitation sequence (YES), method 500 returns to 502. If it is determined not to drive the at least one other transmit row with the excitation sequence (NO), method 500 ends. In this way, a desired portion of the touch sensor matrix may be scanned for touch input.

As alluded to above, the reference sequences $H_n$ implemented in correlators 404 may be designed based on a variety of criteria to effect a wide variety of signal processing on the received signal R. Generally, desired processing of the received signal R may include preserving and/or emphasizing portions of the received signal corresponding to an excitation sequence and to touch input, while mitigating signal portions corresponding to noise, for example.

In some implementations, the first reference sequence $H_1$ may be designed according to matched filter design protocols. If the first reference sequence $H_1$ is designed under the assumption of white noise conditions, $H_1$ may be designed based on an expectation of the received signal R. In some examples, as the received signal R is expected to correspond closely with the excitation sequence that, when transmitted, results in reception of the received signal R, the excitation sequence may be used as the first reference sequence $H_1$.

The second reference sequence $H_2$ may be designed to differ from the first reference sequence $H_1$ so that additional signal processing is provided beyond that afforded by the first reference sequence. In some implementations, brute force searching may be used to search for a desirable second reference sequence $H_2$. The brute force search may comprise identifying each candidate (e.g., possible) second reference sequence, and for each candidate second reference sequence, calculating a touch detection performance score of a combined reference sequence, the combined reference sequence being a sum of the first reference sequence and the candidate second reference sequence under test. The touch detection performance score may be computed in various suitable manners; in some examples, higher scores may be computed for combined reference sequences that mitigate noise to a greater extent than the first reference sequence alone, mitigate noise in specific frequency bands, produce output with less variance than that produced by the first reference sequence alone, etc. In some examples, computation of the touch detection performance score may include correlating a signal with the combined reference sequence.

In some examples, candidate second reference sequences that are completely uncorrelated (e.g., correlation value of zero) with a signal portion of an expectation of the received signal R may be excluded from the brute force search. If, for example, the received signal R is expressed as the sum of a signal portion S and noise N, the result of performing the combined correlation operation on the received signal R with the first and second reference sequences $H_1$ and $H_2$ may assume the following form: $Y_c=(\frac{1}{2})*(\Sigma H_1(k)*(S(k)+N(k))+\Sigma H_2(k)*(S(k)+N(k)))$. Because the second reference sequence $H_2$ is completely uncorrelated with the signal portion S (e.g., $\Sigma H_2(k)*(S(k)=0)$, $Y_c$ reduces to $Y_c=(\frac{1}{2})*(\Sigma H_1(k)*(S(k)+N(k))+\Sigma H_2(k)*(N(k)))$. As can be seen from $Y_c$ in this reduced form, the use of the second reference sequence $H_2$ does not mitigate noise but in fact preserves it. Accordingly, candidate second reference sequences that are at least partially correlated with the signal portion of an expected received signal may be searched for.

The brute force search described above may be performed exhaustively by testing each possible candidate second reference sequence. For digital reference sequences given a fixed number of digital values, the brute force search may test each possible permutation of the number of digital values that differ from that of the first reference sequence. As the number of possible candidate second reference sequences may be very large, exhaustive searching of each candidate second reference sequence may be prohibitively time-consuming even when performed using vast amounts of computational resources. As such, the number of candidate second reference sequences may be reduced by using a rule set to derive a reduced number of candidate second reference sequences. The rule set may focus searching on candidate second reference sequences that are derived from the first reference sequence so that the two sequences are at least partially correlated for the reasons described above.

Figure 6:
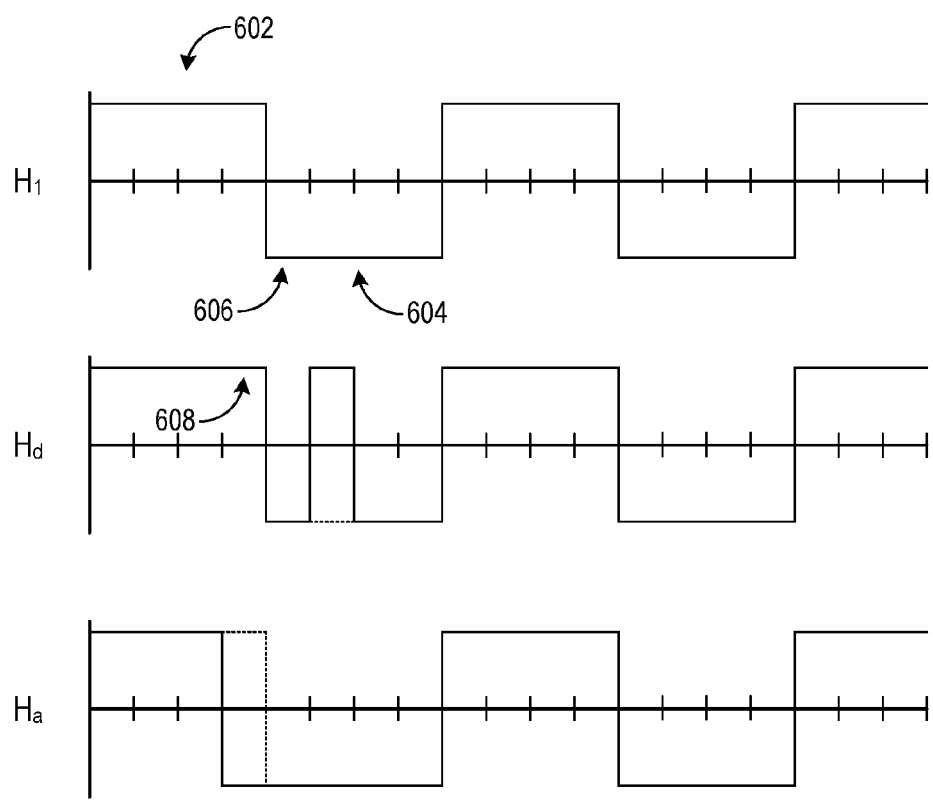
FIG. 6 illustrates some of the potential rules that may be included in a rule set used to derive a reduced number of candidate reference sequences.

FIG. 6 illustrates some of the potential rules that may be included in the rule set. A first reference sequence $H_1$ is shown, which in this example is equated to an example excitation sequence comprising five pulses (e.g., pulse 602). The pulses are binary and each comprise four bits such that the first reference sequence comprises the following bits in the order shown in FIG. 6: 1, 1, 1, 1, −1, −1, −1, −1, 1, 1, 1, 1, −1, −1, −1, −1, 1, 1, 1, 1. The illustrated bit values are non-limiting, as is the binary nature of the reference sequences; non-binary reference sequences are contemplated as well.

The rule set may include a rule excluding candidate reference sequences derived from the first reference sequence $H_1$ by changing at least one bit in a middle portion of at least one pulse of the first reference sequence. FIG. 6 shows a disallowed reference sequence $H_d$ derived from the first reference sequence $H_1$ in such a manner; to derive the disallowed reference sequence, a bit of value −1 in a middle portion 604 of the first reference sequence was changed to the value 1. This change, however, may add high-frequency features to the disallowed reference sequence $H_d$ in the frequency domain. This may result in the preservation of high-frequency noise when used in the combined correlation operation.

In some implementations, the majority of the power of the received signal R may reside at the beginning of each pulse or peak of the received signal, should the received signal include pulses or a time-varying waveform. As such, altering bits at the head of pulses of a candidate reference sequence may significantly alter the output of the combined correlation operation performed with such a candidate reference sequence. The rule set may thus alternatively or additionally include a rule excluding candidate reference sequences derived from the first reference sequence $H_1$ by changing at least one bit at a head (e.g., head 606) of at least one pulse of the first reference sequence.

Conversely, the rule set may alternatively or additionally include a rule allowing candidate reference sequences derived from the first reference sequence $H_1$ by changing at least one bit at a tail of at least one pulse of the first reference sequence. FIG. 6 shows an allowed reference sequence $H_a$ derived from the first reference sequence $H_1$ in such a manner; to derive the allowed reference sequence, a bit of value 1 at a tail 608 of the first reference sequence was changed to the value −1. The allowed reference sequence $H_a$ may facilitate desired noise mitigation when used in the combined correlation operation without preserving high-frequency features or unacceptably altering the received signal R against which it is correlated.

FIG. 6 also illustrates how multiple reference sequences used together in the combined correlation operation may share one or more properties. For example, the first reference sequence $H_1$ and the allowed reference sequence $H_a$, used together in the combined correlation operation in this example, are of equal length (e.g., both comprise 20 bits), comprise an equal number of pulses (e.g., five pulses), are temporally aligned, and are both digital. The reference sequences are shown in FIG. 6 in contiguous fashion for the purpose of clarity; when digitally sampled, the reference sequences may comprise discrete values, which are presented by the tick marks spanning the horizontal axis of each reference sequence plot.

While the candidate reference sequence search process is described above with reference to a second candidate reference sequence, the search process, whether an exhaustive brute force search or a relatively narrowed search using the rule set, may be used to find virtually any number of candidate reference sequences. In other words, the search process may be used to find two or more candidate reference sequences to be used together with a first reference sequence in the combined correlation operation. In this example, touch performance scores may be computed for the set of candidate reference sequences under test—e.g., using a combined reference sequence computed as a sum of the first reference sequence and each of the candidate reference sequences in the set of candidate reference sequences under test.

Figure 7:
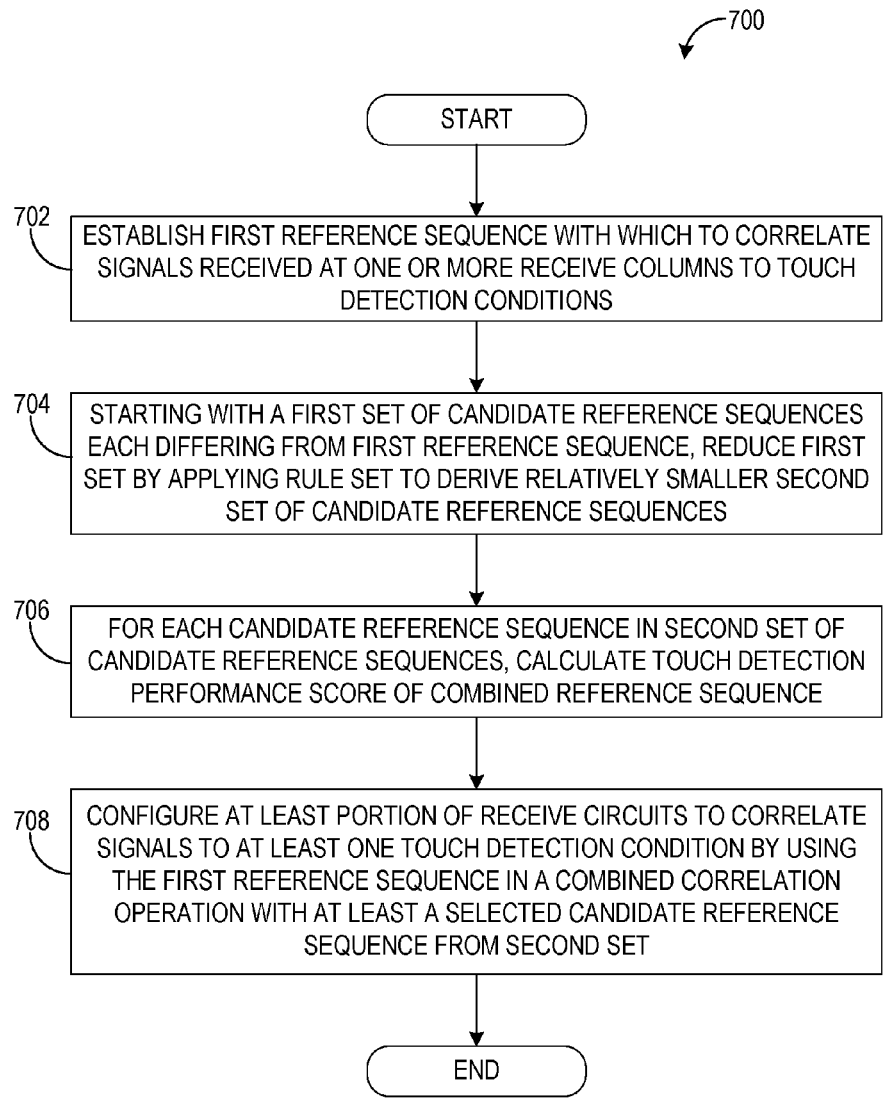
FIG. 7 shows a flowchart illustrating a method of configuring receive circuits attached to receive columns in a touch sensor matrix.

FIG. 7 shows a flowchart illustrating a method 700 of configuring receive circuits attached to receive columns in a touch sensor matrix. With reference to FIG. 3, method 700 may be used to configure receivers 310 of touch sensor matrix 300, for example. In some examples, method 700 may be performed at design time prior to configuring receive circuits.

At 702 of method 700, a first reference sequence is established with which to correlate signals received at one or more of the receive columns to touch detection conditions. The first reference sequence may be established in various suitable manners; in some examples, it may be established based on matched filter design and/or white noise conditions. For some scenarios, the first reference sequence may be equated to an excitation sequence used to drive one or more of the transmit rows. Further, the touch detection conditions may comprise any suitable number and type of conditions; in some examples, the conditions may include definite (e.g., touch definitively detected, touch absence definitively confirmed) and indefinite (e.g., presence or absence of touch cannot be definitively determined) touch detection conditions.

At 704 of method 700, starting with a first set of candidate reference sequences each differing from the first reference sequence, the first set of candidate reference sequences is reduced by applying a rule set to the first set to derive a relatively smaller second set of candidate reference sequences. The first set of candidate reference sequences may comprise all candidate reference sequences that differ from the first reference sequence, for example. The rule set may include any suitable number and type of rules, such as rules that disallow reference sequences that can result in significant changes to a received signal when used in the combined correlation operation, reference sequences that fail to reduce noise in an undesired frequency range by a threshold amount when used in the combined correlation operation, etc.

At 706 of method 700, for each candidate reference sequence in the second set of candidate reference sequences, a touch detection performance score of a combined reference sequence is calculated. The combined reference sequence may be a sum of the first reference sequence and at least the candidate reference sequence for which the calculating is performed. Thus, for scenarios in which a second reference sequence to be used with the first reference sequence is searched for, the combined reference sequence may be a sum of two reference sequences. For scenarios in which two or more candidate reference sequences to be used with the first reference sequence are searched for, the combined reference sequence may be a sum of the first reference sequence and each of the two or more reference sequences. The touch detection performance score may be defined in various suitable manners; in some examples, calculating the performance score may include correlating the reference sequences under test with a signal, assessing statistical properties of output from the combined correlation operation with the reference sequences under test, etc.

At 708 of method 700, at least a portion of the receive circuits is configured to correlate signals received at one or more of the receive columns to at least one of the touch detection conditions by using the first reference sequence in the combined correlation operation with at least a selected candidate reference sequence from the second set of candidate reference sequences. The selected candidate reference sequence may be selected based on a corresponding touch detection performance score—e.g., the touch detection performance score calculated for the combined reference sequence using the selected candidate reference sequence. Candidate reference sequence selection based on the touch detection performance score may be performed in various suitable manners; in some examples, the candidate reference sequence for which the highest touch detection performance score is calculated is selected. In other examples, a candidate reference sequence for which a touch detection performance score above a threshold is calculated is selected, which may enable the candidate reference sequence search process to be truncated as soon as an acceptable reference sequence is found. As described above, at least the portion of the receive circuits may be configured to correlate signals using two or more selected candidate reference sequences, where the two or more selected candidate reference sequences may be selected based on a touch detection performance score calculated for the two or more selected candidate reference sequences.

In some implementations, different candidate reference sequences may be selected for different receive columns in the touch sensor matrix. Method 700 may thus be performed on a receive column-specific basis, for example, which may partially compensate variance in touch sensor output across two or more receive columns.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
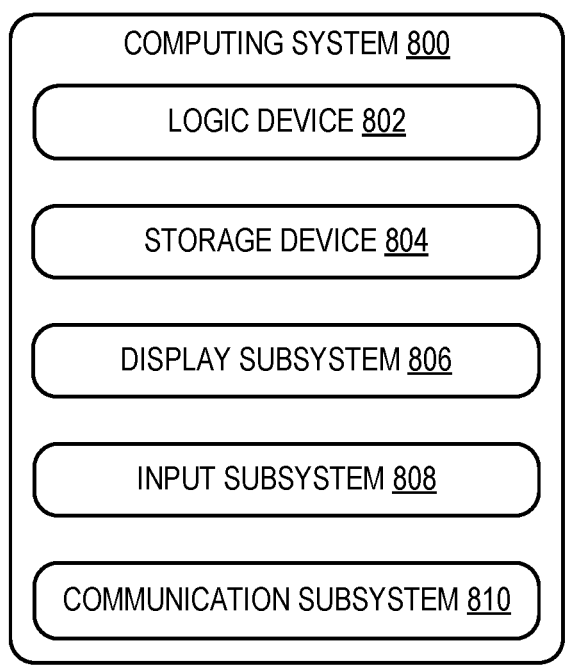
FIG. 8 shows a block diagram of an example computing device.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), wearable devices, and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration. In one example, the logic machine may include a controller for a touch sensor matrix. For example, the controller may be operable to execute instructions held by a storage machine to drive at least one transmit row of the touch sensor matrix with an excitation sequence, receive at at least one receive column a received signal resulting from driving of the at least one transmit row, correlate the received signal with each of two or more reference sequences, combine each result from each correlation of the received signal with a respective reference sequence to determine a combined correlation value, the combined correlation value being equivalently determined by correlating the received signal with a combination of the two or more reference sequences, and identify at least one touch detection condition based on the combined correlation value.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

Storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

A "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides a method comprising establishing a first reference sequence with which to correlate signals received at one or more receive columns to touch detection conditions, starting with a first set of candidate reference sequences each differing from the first reference sequence, reducing the first set of candidate reference sequences by applying a rule set to the first set to derive a relatively smaller second set of candidate reference sequences, for each candidate reference sequence in the second set of candidate reference sequences, calculating a touch detection performance score of a combined reference sequence, the combined reference sequence being a sum of the first reference sequence and at least the candidate reference sequence for which the calculating is performed, and configuring at least a portion of a receive circuit to correlate signals received at one or more of the receive columns to at least one of the touch detection conditions by using the first reference sequence in a combined correlation operation with at least a selected candidate reference sequence from the second set of candidate reference sequences, the selected candidate reference sequence being selected based on a corresponding touch detection performance score. In such an example, the combined reference sequence may alternatively or additionally include an additional candidate reference sequence from the second set of candidate reference sequences, the additional candidate reference sequence differing from the first reference sequence and the selected candidate reference sequence. In such an example, the portion of the receive circuit may alternatively or additionally be configured to correlate the signals to the at least one touch detection condition by using the additional candidate reference sequence along with the first reference sequence and the selected candidate reference sequence in the combined correlation operation. In such an example, the first reference sequence may alternatively or additionally be established based on an excitation sequence used to drive one or more transmit rows. In such an example, the rule set may alternatively or additionally include a rule excluding candidate reference sequences derived from the first reference sequence by changing at least one bit in a middle portion of at least one pulse of the first reference sequence. In such an example, the rule set may alternatively or additionally include a rule allowing candidate reference sequences derived from the first reference sequence by changing at least one bit at a tail of at least one pulse of the first reference sequence. In such an example, the rule set may alternatively or additionally include a rule excluding candidate reference sequences that, when used in the combined correlation operation, fail to reduce noise in an undesired frequency range by a threshold amount. In such an example, the rule set may alternatively or additionally include a rule excluding candidate reference sequences derived from the first reference sequence by changing at least one bit at a head of at least one pulse of the first reference sequence. In such an example, the first reference sequence and the at least one selected candidate reference sequence may alternatively or additionally be of equal length. In such an example, the first reference sequence and the at least one selected candidate reference sequence may alternatively or additionally include an equal number of pulses. In such an example, each corresponding pair of pulses in the first reference sequence and the at least one selected candidate reference sequence may alternatively or additionally be temporally aligned. In such an example, the first reference sequence and the at least one selected candidate reference sequence may alternatively or additionally be digital. Any or all of the above-described examples may be combined in any suitable manner in various implementations.

Another example provides a system comprising a touch sensor matrix having at least one transmit row and at least one receive column, a processor, and a storage machine comprising instructions executable by the processor to drive at least one transmit row of the touch sensor matrix with an excitation sequence, receive at at least one receive column a received signal resulting from driving of the at least one transmit row, correlate the received signal with each of two or more reference sequences, combine each result from each correlation of the received signal with a respective reference sequence to determine a combined correlation value, the combined correlation value being equivalently determined by correlating the received signal with a combination of the two or more reference sequences, and identify at least one touch detection condition based on the combined correlation value. In such an example, the two or more reference sequences may alternatively or additionally be at least partially correlated. In such an example, the two or more reference sequences may alternatively or additionally be binary. In such an example, the combination of the two or more reference sequences may alternatively or additionally be non-binary. In such an example, a first reference sequence of the two or more reference sequence may alternatively or additionally be the excitation sequence. Any or all of the above-described examples may be combined in any suitable manner in various implementations.

Another example provides a system comprising a plurality of transmit rows each attached to a respective driver configured to drive that transmit row with an excitation sequence, a plurality of receive columns each configured to receive at that receive column a received signal resulting from at least one driven transmit row, a plurality of receivers each attached to a respective receive column, each receiver having two or more correlators each configured to correlate the received signal with a respective reference sequence, and a combiner configured to combine each result from each correlator to determine a combined correlation value, the combined correlation value being equivalently determined by correlating the received signal with a combination of the two or more reference sequences, a controller configured to identify at least one touch detection condition based on the combined correlation value. In such an example, the two or more reference sequences may alternatively or additionally be binary. In such an example, the combination of the two or more reference sequences may alternatively or additionally be non-binary. In such an example, a first reference sequence of the two or more reference sequences may alternatively or additionally be the excitation sequence. In such an example, a second reference sequence of the two or more reference sequences may alternatively or additionally be derived from the first reference sequence. Any or all of the above-described examples may be combined in any suitable manner in various implementations.

The configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
   a logic machine; and
   a storage machine holding instructions executable by the logic machine to:
      establish a first reference sequence with which to correlate signals received at one or more receive columns to touch detection conditions;
      starting with a first set of candidate reference sequences each differing from the first reference sequence, reduce the first set of candidate reference sequences by applying a rule set to the first set to derive a relatively smaller second set of candidate reference sequences;
      for each candidate reference sequence in the second set of candidate reference sequences, calculate a touch detection performance score of a combined reference sequence, the combined reference sequence being a sum of the first reference sequence and at least the candidate reference sequence for which the calculating is performed; and
      configure at least a portion of a receive circuit to correlate signals received at one or more of the receive columns to at least one of the touch detection conditions by using the first reference sequence in a combined correlation operation with at least a selected candidate reference sequence from the second set of candidate reference sequences, the selected candidate reference sequence being selected based on a corresponding touch detection performance score.

2. The computing device of claim 1, wherein the combined reference sequence further includes an additional candidate reference sequence from the second set of candidate reference sequences, the additional candidate reference sequence differing from the first reference sequence and the selected candidate reference sequence, and
   wherein the portion of the receive circuit is configured to correlate the signals to the at least one touch detection condition by using the additional candidate reference sequence along with the first reference sequence and the selected candidate reference sequence in the combined correlation operation.

3. The computing device of claim 1, wherein the first reference sequence is established based on an excitation sequence used to drive one or more transmit rows.

4. The computing device of claim 1, wherein the rule set includes a rule excluding candidate reference sequences derived from the first reference sequence by changing at least one bit in a middle portion of at least one pulse of the first reference sequence.

5. The computing device of claim 1, wherein the rule set includes a rule allowing candidate reference sequences derived from the first reference sequence by changing at least one bit at a tail of at least one pulse of the first reference sequence.

6. The computing device of claim 1, wherein the rule set includes a rule excluding candidate reference sequences that, when used in the combined correlation operation, fail to reduce noise in an undesired frequency range by a threshold amount.

7. The computing device of claim 1, wherein the rule set includes a rule excluding candidate reference sequences derived from the first reference sequence by changing at least one bit at a head of at least one pulse of the first reference sequence.

8. The computing device of claim 1, wherein the first reference sequence and the at least one selected candidate reference sequence are of equal length.

9. The computing device of claim 1, wherein the first reference sequence and the at least one selected candidate reference sequence include an equal number of pulses.

10. The computing device of claim 1, wherein each corresponding pair of pulses in the first reference sequence and the at least one selected candidate reference sequence are temporally aligned.

11. The computing device of claim 1, wherein the first reference sequence and the at least one selected candidate reference sequence are digital.

12. A method, comprising:
   for at least one transmit row and at least one receive column of a touch sensor matrix:
      driving the at least one transmit row with an excitation sequence;
      receiving at the at least one receive column a received signal resulting from driving of the at least one transmit row;
      correlating the received signal with each of two or more reference sequences;
      combining each result from each correlation of the received signal with a respective reference sequence to determine a combined correlation value, the combined correlation value being equivalently determined by correlating the received signal with a combination of the two or more reference sequences; and
      identifying at least one touch detection condition based on the combined correlation value.

13. The method of claim 12, wherein the two or more reference sequences are at least partially correlated.

14. The method of claim 12, wherein the two or more reference sequences are binary.

15. The method of claim 12, wherein the combination of the two or more reference sequences is non-binary.

16. The method of claim 12, wherein a first reference sequence of the two or more reference sequences is the excitation sequence.

17. A method, comprising:
   for a plurality of transmit rows and a plurality of receive columns of a touch sensor matrix:
      driving, via a respective driver, each of the plurality of transmit rows with an excitation sequence;
      receiving, via a respective receiver, a received signal resulting from the plurality of driven transmit rows at each of the plurality of receive columns;
      correlating, for each of the respective receivers, via two or more correlators of the respective receiver, the received signal with a respective reference sequence;

combining, for each of the respective receivers, via a combiner of the respective receiver, each result from the two or more correlators to determine a combined correlation value, the combined correlation value being equivalently determined by correlating the received signal with a combination of the respective reference sequences; and identifying, via a controller, at least one touch detection condition based on the combined correlation values.

18. The method of claim 17, wherein the respective reference sequences are binary, and wherein the combination of the respective reference sequences is non-binary.

19. The method of claim 17, wherein a first reference sequence of the respective reference sequences is the excitation sequence.

20. The method of claim 19, wherein a second reference sequence of the respective reference sequences is derived from the first reference sequence.

* * * * *